US006456178B1

(12) United States Patent
Chiu

(10) Patent No.: US 6,456,178 B1
(45) Date of Patent: Sep. 24, 2002

(54) FUEL PIPE MAGNETIZING STRUCTURE

(76) Inventor: Hsiang-Lan Chiu, No. 159, Lane 247, Da Chiao 1st St., Yung Kang City, Tainan Hsien (TW)

( * ) Notice: Subject to any disclaimer, the term of this patent is extended or adjusted under 35 U.S.C. 154(b) by 0 days.

(21) Appl. No.: 10/102,694

(22) Filed: Mar. 22, 2002

(51) Int. Cl.[7] .............................................. B01D 35/06

(52) U.S. Cl. ........................ 335/306; 210/222; 123/538

(58) Field of Search ................................ 335/302–306; 210/222; 123/538

(56) References Cited

U.S. PATENT DOCUMENTS 4,601,823 A * 7/1986 Beck .......................... 210/222

* cited by examiner

*Primary Examiner*—Ramon M. Barrera
(74) *Attorney, Agent, or Firm*—Rosenberg, Klein & Lee

(57) ABSTRACT

The structure of a fuel pipe magnetizer comprises a pair of semicircular permanent magnets, which forms a circular magnetized body mounted in an open end of a sleeve, the other end of the sleeve has a ridge with a hole at the center portion thereof, and a slot formed axially along the side for quick installation of the fuel pipe, one semicircular permanent magnet is placed inside of the sleeve, and then the fuel pipe is inserted through the slot into the sleeve, and finally the other semicircular permanent magnet is sealed into the open end of the sleeve, whereas one sector of the fuel pipe will be sealed by the permanent magnets.

3 Claims, 5 Drawing Sheets

FUEL PIPE MAGNETIZING STRUCTURE

BACKGROUND OF THE INVENTION

1. Field of the Invention

This invention relates to a fuel pipe magnetization structure, and more particularly to one that is easy to install a magnetizing device to magnetize the fuel flowing in the fuel pipe.

2. Description of the Prior Art

There are many inventions on the market in related to accelerating fuel consumption, one of which is to magnetize the fuel, this invention was applied and has been awarded with patent. According to the patent, magnetizing fuel may activate the hydrogen in the fuel and increase the carbon to mix with oxygen instantly for burning thoroughly.

The prior magnetizer structures are generally in two categories, one is to form a spiral shaped magnetizing pipe and the other is to form a magnetizer either in the fuel pipe or connect to the fuel pipe. However, all these designs require to cut the pipe or connect to the two ends of the magnetizer or to insert the magnetizer directly into the fuel pipe. Both of these structures may cause leaking if the work is not properly done.

In view of this and many other shortcomings, the inventor has invented the present invention.

SUMMARY OF THE INVENTION

It is the primary object of the invention to provide a fuel magnetizing structure, which is easy to install without damaging any of the original parts.

It is another object of the invention to provide a fuel magnetizing structure, which is easy to install and saves labor.

It is a further object of the present invention to provide a fuel magnetizing structure, which is cost effectiveness in manufacture.

DETAILED DESCRIPTION OF THE PREFERRED EMBODIMENTS

Figure 1:
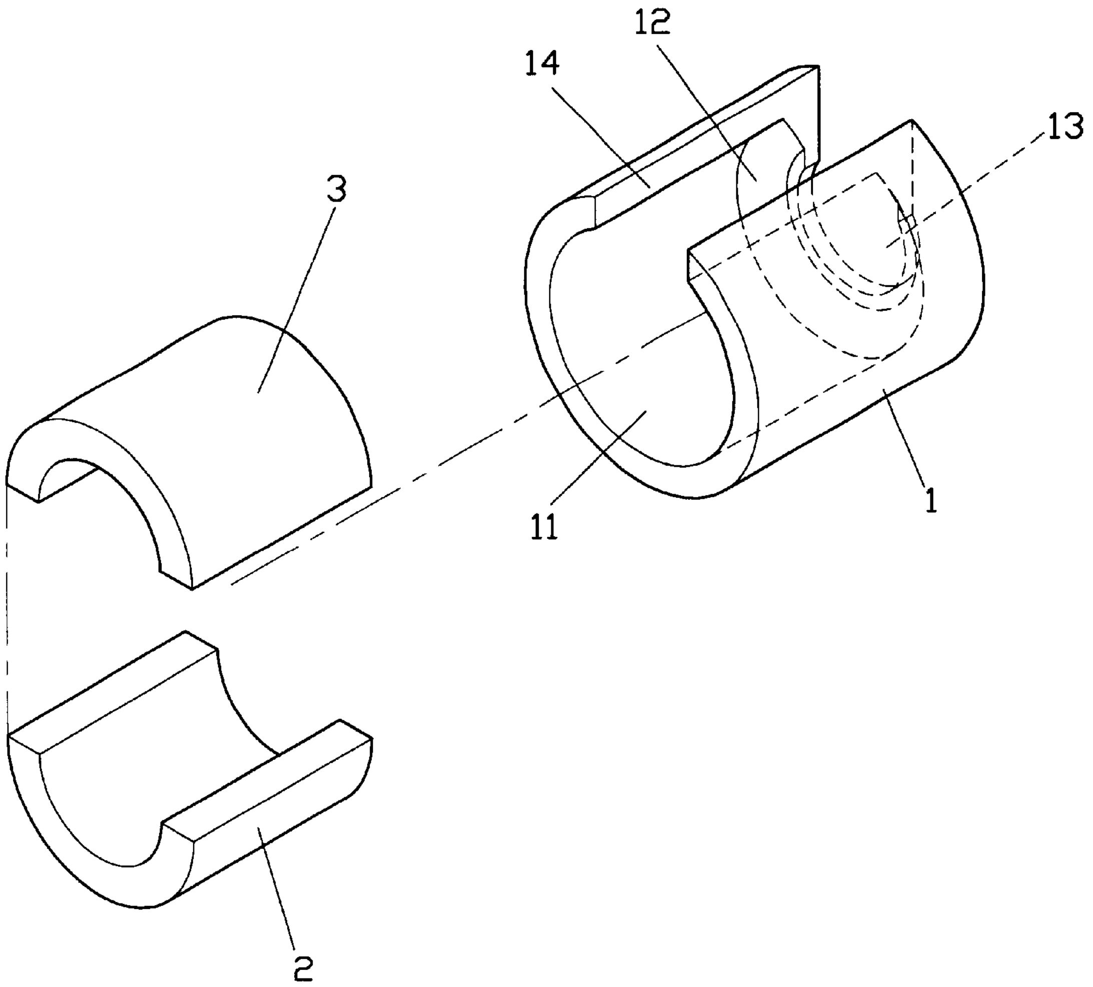
FIG. 1 is an exploded view of the present invention.

The fuel pipe magnetizing structure, as shown in FIG. 1, comprises a sleeve 1, and a pair of semicircular permanent magnets 2 and 3 seating in the sleeve 1 to encircle a sector of the fuel pipe.

The sleeve 1 is formed with isolating material or non-magnetization material in order to demagnetize by the permanent magnets 2 and 3. The semicircular permanent magnets 2 and 3 form a circular shape, whereas the inner diameter of the circular shape corresponds to the outer diameter of a fuel pipe 4. The sleeve 1 is so designed that one end of which has an open end 11 adapted to receive the two permanent magnets 2 and 3, while the other end of which has a ridge 12 with an opening 13 at the center portion thereof for the fuel pipe 4 to go there through. A slot 14 is formed on one side of the sleeve 1 interconnected with the hole 13 of the sleeve 1, so that the fuel pipe 4 may slide through and seat in the sleeve 1.

Figure 2:
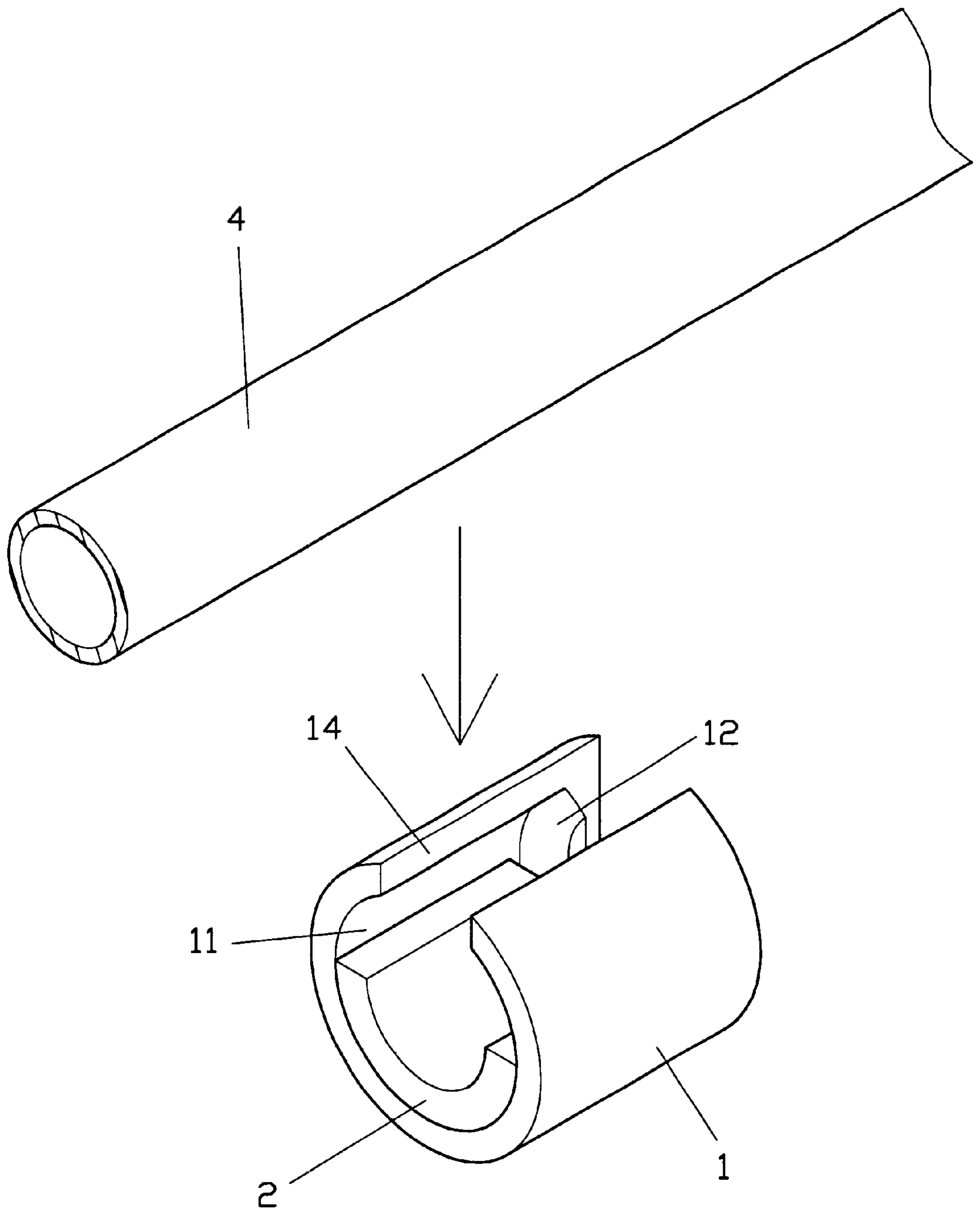
FIG. 2 is a perspective view showing a first step of installation of a fuel pipe into the present invention.
Figure 3:
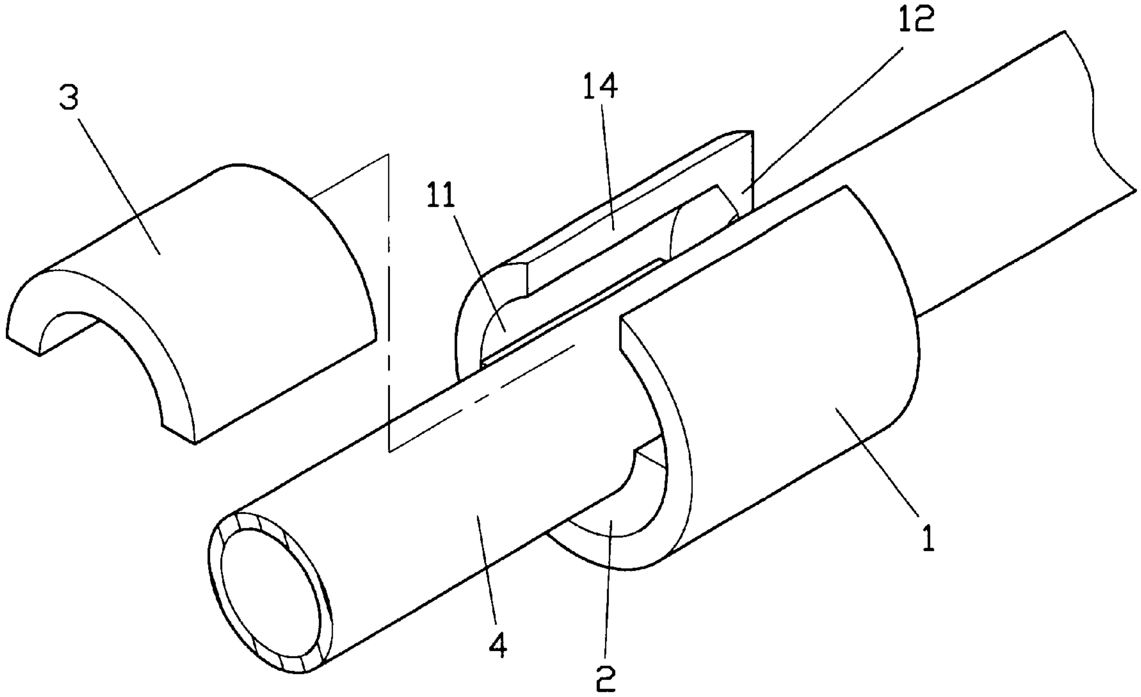
FIG. 3 is a second step of installation of the fuel pipe.
Figure 4:
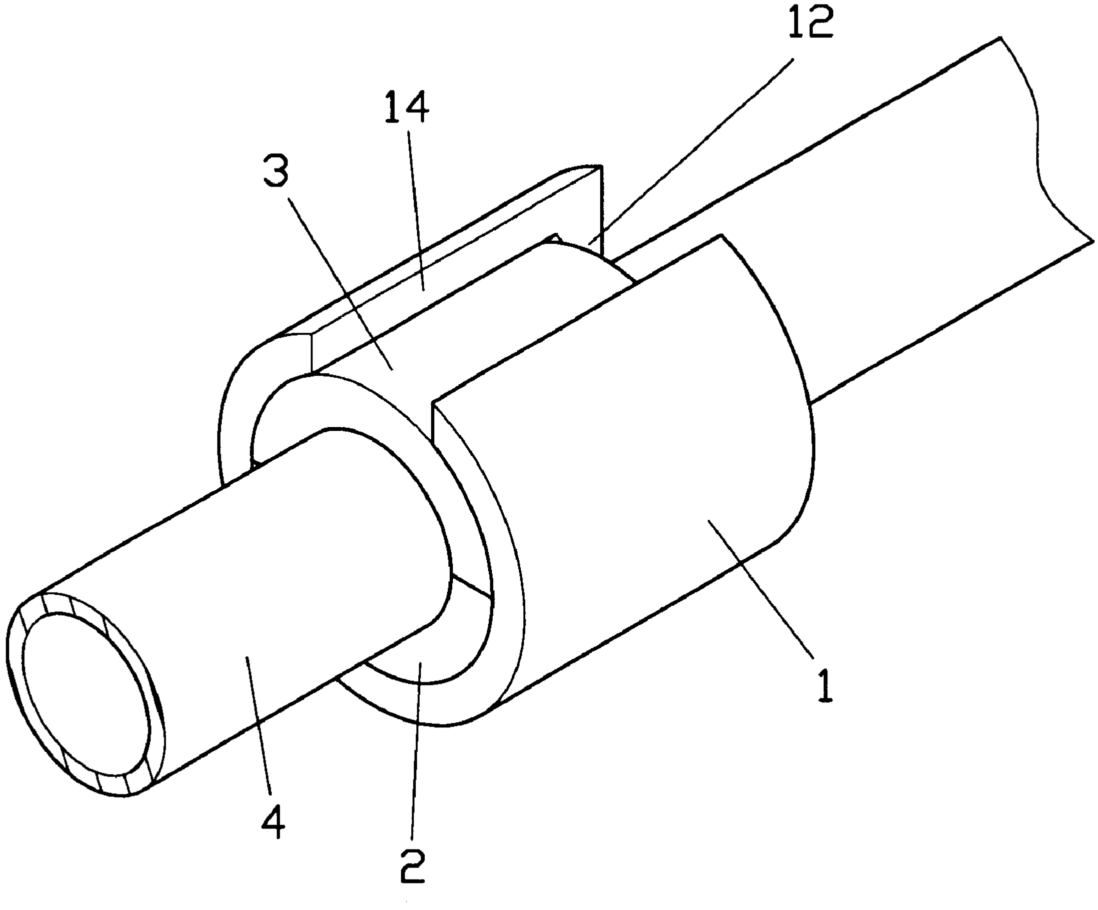
FIG. 4 is a perspective view of the present invention after installation of the fuel pipe.

To assemble the present invention, the semicircular permanent magnet 2 is placed in the sleeve 1 and located on the side opposing the slot 14, as shown in FIGS. 2 and 3, then the fuel pipe 4 is inserted into the sleeve 1 through the slot 14 and engaged with the inner surface of the permanent magnet 2, and then the other semicircular permanent magnet 3 is inserted into the sleeve 1, that forms a circular shape with the semicircular permanent magnet 2 with the outer diameter engaging with the inner diameter of the sleeve 1, whereas the fuel pipe 4 will have one sector enclosed in the two semicircular permanent magnets 2 and 3 while another sector of the fuel pipe 4 is inserted through the hole 13 of the sleeve 1, as shown in FIG. 4. The opposing character of the two semicircular permanent magnets 2 and 3 forces the permanent magnets 2 and 3 to engage with the sleeve 1, tightly. This design illuminates the procedure of cutting the fuel pipe, as the prior art does.

Figure 5:
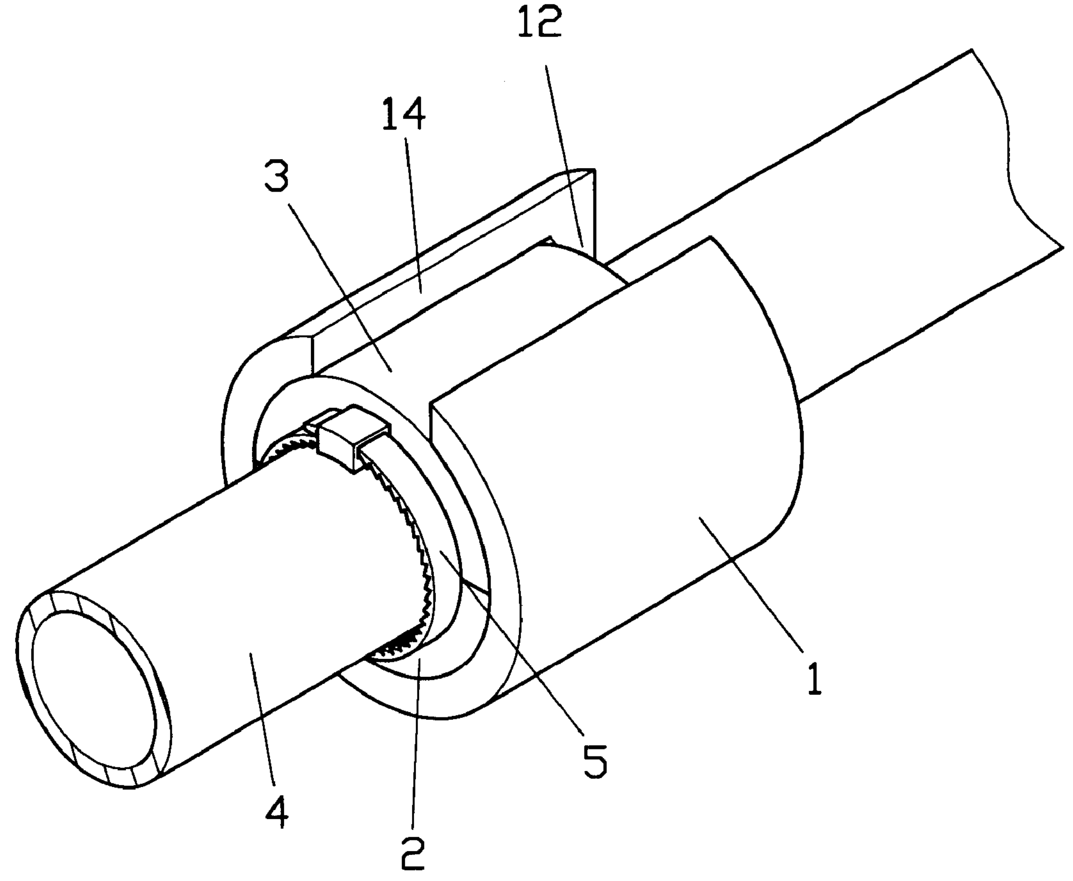
FIG. 5 is a perspective view of the present invention incorporated with a clip.

In order to secure the permanent magnets 2 and 3 in the sleeve 1, a clip 5 is used, as shown in FIG. 5, which may be formed with teeth at the inner surface to mesh with the sector of the fuel pipe 4.

In this design, fuel flows through the circular shape formed by the permanent magnets 2 and 3, and gets magnetized, that increases the rate of burning.

I claim:

1. A fuel pipe magnetization structure comprising a sleeve, and a pair of permanent magnets, said pair of permanent magnets forming a circular shape with an inner diameter corresponding to an outer diameter of said fuel pipe, said sleeve having an open end with an inner diameter corresponding to an outer diameter of said circular shape formed by said pair of permanent magnets, a ridge at the other end of said sleeve with a hole at a center portion thereof, and a slot at one side of said sleeve interconnected with said hole, whereas said slot being adapted for a fuel pipe to slide through there and seating in said sleeve.

2. The fuel pipe magnetization structure, as recited in claim 1, wherein said sleeve is made of isolating and non-magnetization material.

3. The fuel pipe magnetization structure, as recited in claim 1, wherein a clip is adapted to secure said permanent magnets within said sleeve.

* * * * *